United States Patent [19]
Easter

[11] 3,916,262
[45] Oct. 28, 1975

[54] LOW VOLTAGE BUS-OPERATED OVERVOLTAGE PROTECTION SYSTEM

[75] Inventor: Finis C. Easter, Canoga Park, Calif.

[73] Assignee: The United States of America as represented by the Secretary of the Navy, Washington, D.C.

[22] Filed: July 23, 1974

[21] Appl. No.: 491,073

[52] U.S. Cl............. 317/31; 317/33 SC; 340/248 A; 340/248 C; 330/30 D; 328/146
[51] Int. Cl.²...................... H02H 3/20; H02H 3/24
[58] Field of Search....... 317/31, 33 VR, 33 SC, 16; 323/22 Z, 68; 307/235 R, 318, 310; 330/23, 30 D; 340/248 A, 248 C; 328/146, 148, 150

[56] References Cited
UNITED STATES PATENTS

| | | | |
|---|---|---|---|
| 3,173,078 | 3/1965 | Farnsworth | 317/33 VR |
| 3,174,094 | 3/1965 | Farnsworth et al. | 317/33 VR |
| 3,214,668 | 10/1965 | Brinster | 323/22 Z |
| 3,430,076 | 2/1969 | Overtveld | 307/310 |
| 3,597,655 | 8/1971 | Forte | 317/33 VR |
| 3,671,770 | 6/1972 | Frederiksen | 307/310 |
| 3,816,761 | 6/1974 | Ahmed | 307/235 R |

FOREIGN PATENTS OR APPLICATIONS

| | | | |
|---|---|---|---|
| 23,306 | 3/1968 | Japan | 323/22 Z |

Primary Examiner—William M. Shoop
Assistant Examiner—Patrick R. Salce
Attorney, Agent, or Firm—R. S. Sciascia; P. Schneider; W. Sheehan

[57] ABSTRACT

An overvoltage protection circuit compares a bus voltage to a reference voltage developed from the bus and produces and output signal initiating appropriate action when the bus threshold levels established by the reference are exceeded. Since the circuit is powered directly from the bus, it does not require an independent power supply. Instead, the combination of a constant current source and a compensated voltage network convert the fluctuating bus voltage into a stabilized reference voltage. The reference voltage is then compared to the bus voltage by differential amplifier means.

4 Claims, 1 Drawing Figure

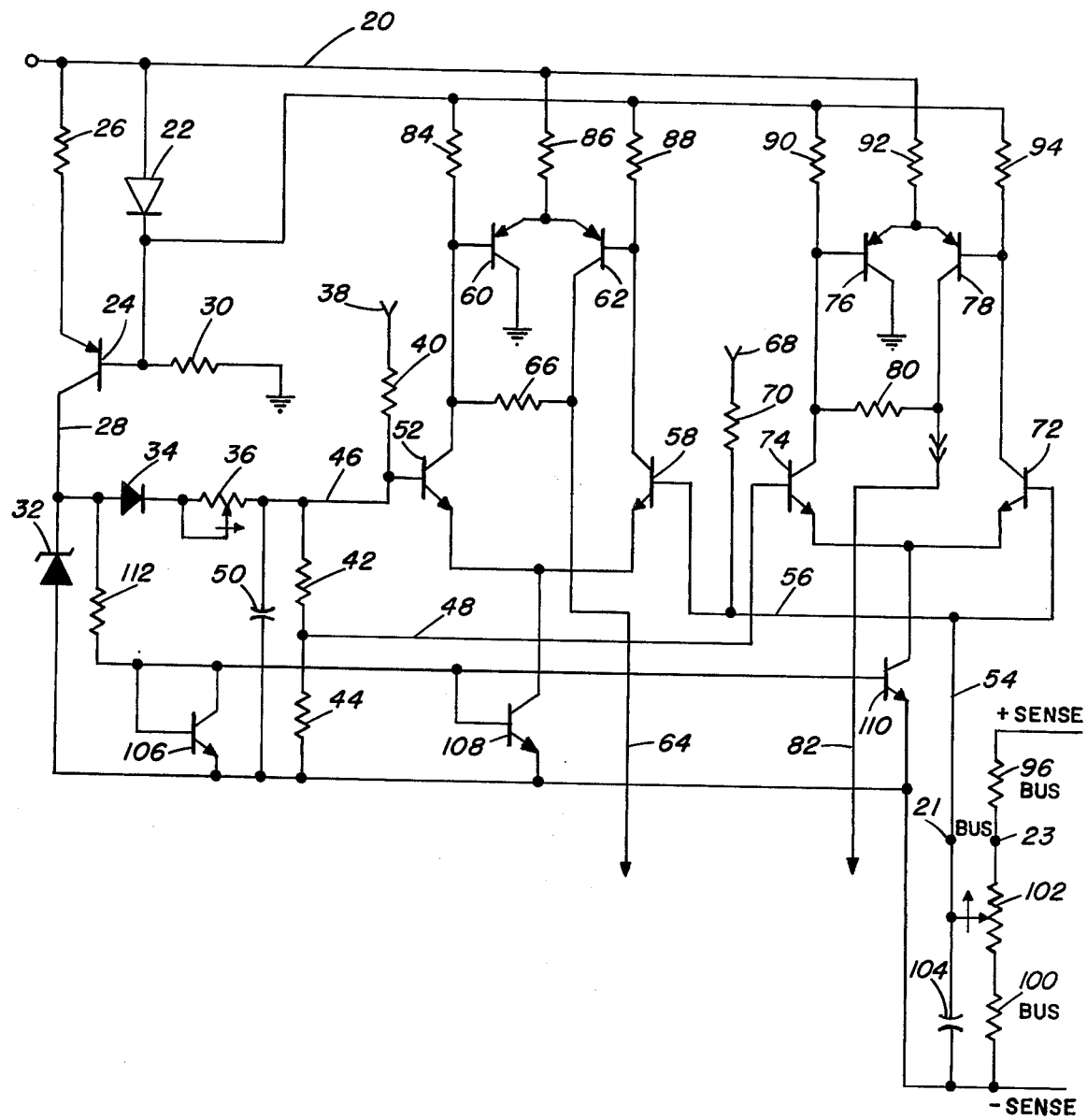

3,916,262

LOW VOLTAGE BUS-OPERATED OVERVOLTAGE PROTECTION SYSTEM

BACKGROUND OF THE INVENTION

1. Field of the Invention

The invention relates, generally to an electrical protection circuit and, more specifically, to an over voltage protection circuit for a power supply.

2. Description of Prior Art

The necessity of special circuitry to monitor the electrical condition of equipment has been well recognized. Faults, such as, excessively high voltages can cause shorting of electrical terminals and lead to breakdown and often destruction of equipment. Because of these reasons, industry now views safety and protection devices for electrical equipment as a necessary part of the equipment itself and a need continually exists for improved methods of monitoring the electrical condition of equipment. In the area of protection circuits for power supplies, however, most of the safety devices require an independent source of power to supply the energy necessary to operate the protection circuit. This requires that the power to the protection circuit be switched on and operating properly in order for the circuit to adequately monitor the equipment.

SUMMARY OF THE INVENTION

The protection circuit of the present invention is powered directly from the bus which it is monitoring, so that any time the bus is energized the circuit is also energized. The circuit compares the bus voltage to an internal reference voltage derived from the bus and initiates appropriate action when it senses an overvoltage condition at the bus. The circuit is amenable to low bus voltages and provides accurate thresholding at unsafe voltage levels.

OBJECTS OF THE INVENTION

An object of the invention is to compare a bus voltage to a reference voltage derived from the bus in a novel manner and produce an output signal which may shut off the power to the bus or drain off the bus energy whenever the bus threshold levels are exceeded.

A more specific object of the invention is to provide a low-voltage, bus-operated overvoltage sensing and protection system utilizing temperature compensation features and two differential amplifiers, one to shut off the bus supply and the other amplifier, with a higher threshold level, to drain the energy from the bus.

BRIEF DESCRIPTION OF THE DRAWING

Other objects, advantages and novel features of the present invention will appear from a reading of the following detailed description of the invention when considered in conjunction with the accompanying drawing, in which the single FIGURE is a schematic diagram of a circuit constructed in accordance with the present invention.

DETAILED DESCRIPTION

Referring in detail to the drawing, the bus voltage is established along line 20 and also referenced across points 21 and 23. This voltage is monitored by a solid state circuit which includes a constant current source consisting of diode 22, resistor 26 and transistor 24. Diode 22 has a relatively constant voltage drop across it when biased into conduction. The constant diode voltage is also maintained across the combination of the base to emitter junction of transistor 24 and series resistor 26, resulting in a constant output from collector electrode 28 of transistor 24. This occurs because diode 22 and the base-to-emitter junction of transistor 24 have similar temperature coefficients of voltage. Resistor 30 experiences a voltage drop equal to the bus voltage minus the constant voltage across diode 22, which provides a bias for transistor 24. The collector output from electrode 28 provides a constant current for reference zener diode 32. Zener diode 32 and diode 34 combine to produce a compensated voltage, with the voltage across diode 34 being subtracted from the zener voltage. The resulting voltage is essentially temperature independent since the zener diode 32 and the forward bias diode 34 each have a temperature coefficient of approximately 2.2 millivolts per degree C. Adjustable resistor 36 corrects any minor errors in the system threshold level and its purpose at a specific point in the circuit is dictated only by the location of a test point which requires compensation for circuit indiscrepencies in order to provide an accurate reading of circuit response. Test point 38 is isolated from the rest of the circuit by high impedance resistor 40. Resistor 36 also acts as a voltage divider with resistors 42 and 44. A high threshold voltage reference is established between resistors 36 and 42. This high voltage reference is conducted through line 46 which is the input to a high level differential amplifier. A lower threshold voltage is established between resistors 42 and 44. The lower voltage reference is conducted via line 48 to a lower level differential amplifier. Capacitor 50 is connected across resistors 42 and 44 to stabilize these reference voltages.

Within the high level differential amplifier, the high level reference voltage is fed via line 46 to the base of transistor 52. This reference voltage is compared to the bus voltage which is fed via lines 54 and 56 to the base of an identical transistor 58. Transistors 52 and 58 comprise an NPN differential amplifier. The output from the NPN differential amplifier is further conducted and amplified by a PNP differential amplifier consisting of transistors 60 and 62. The PNP amplification stage is required in accurate systems because of the temperature coefficient of voltage of a base-emitter junction. In addition the PNP amplifier insures that the output on line 64 is the correct polarity, so that as long as the voltage reference to the base of transistor 52 exceeds the bus voltage to the base of transistor 58, line 64 does not conduct a responsive output. However, when the voltage reference to the base of transistor is less than the bus voltage to the base of transistor 58, the output on line 64 triggers an appropriate response. Resistor 66 provides positive feedback and Schmitt trigger action without reducing the accuracy of the threshold. Test point 68 and isolation resistor 70 are present to test the bus input to both the high and low differential amplifiers.

The low level differential amplifier operates in an analogous manner. The bus input is conducted via lines 54 and 56 to the base of transistor 72. The lower level reference voltage is fed through line 48 to an identical transistor 74. Transistors 72 and 74 comprise an NPN difference amplifier. The secondary amplification is again provided by a PNP differential amplifier consisting of transistors 76 and 78. Positive feedback and Schmitt trigger action is provided by resistor 80. When the bus voltage exceeds the lower reference voltage an output on line 82 initiates an appropriate response.

Resistors 84-94 are all biasing resistors for the PNP amplifiers so that maximum control of the base voltages occurs near the threshold levels. Resistors 96 and 100 provide high resolution for potentiometer 102 while capacitor 104 in combination with resistors 100 and 102 performs a band pass operation to provide low noise tripping. Transistors 106, 108 and 110 are matched and configured as a current mirror. The reference current for the mirror is derived from zener diode 32 through resistor 112, and thus is relatively independent of temperature and bus voltage fluctuations as the temperature coefficients of diode 32 and transistor 106 are similar. The current mirror provides a constant current sink without an additional negative supply and large resistor of the more typical "long tailed pair."

Summarizing the operation of the circuit, the lower threshold output on line 82 can generally be used initiate a response such as shutting down the bus supply. The high threshold output on line 64 is then used to initiate a backup safety feature in the event the first response fails. Generally, a 5 percent voltage differential between the high and low thresholds is established and for example may result in a low threshold of 1.9 volts and a high threshold of 2.0 volts sensed at resistor 102. Such a backup feature might include connecting line 64 to an SCR gate for crowbar initiation i.e., to draw current from the bus. In any event, the threshold voltages are derived directly from the bus voltage on line 20. This fluctuating voltage is used to drive a constant current source (diode 22 and transistor 24), the output of which is conducted to a voltage compensation circuit (diodes 32 and 34) having an essentially constant voltage output. Both high and lower threshold voltages are derived from this constant voltage output (lines 46 and 58 respectively) and conducted to corresponding differential amplifiers. Within the differential amplifiers, the threshold voltages are compared to the bus voltage and appropriate responses initiated when the threshold voltages are exceeded by the bus voltage.

Typical values for the various circuit elements are as follows:

| Circuit Element | Value and/or Number | |
|---|---|---|
| 22 | CR 51 | 2902749 |
| 24 | Q 18 | 2N2905A |
| 26 | 22 Ω | |
| 30 | 470 Ω | |
| 32 | CR 32 | 1N746A |
| 34 | CR 10 | |
| 36 | 1 K Ω | |
| 40 | 10 K Ω | |
| 42 | 19.6 Ω | |
| 44 | 464 Ω | |
| 50 | C 15 | 2200 pf |
| 52 | U-19-A | |
| 58 | U-19-B | |
| 60 | Q 26 | 2N2905A |
| 62 | Q 23 | 2N2905A |
| 66 | 150 K Ω | |
| 70 | 10 K Ω | |
| 72 | U-20-B | |
| 74 | U-20-A | |
| 76 | Q 27 | 2N2905A |
| 78 | Q 19 | 2N2905A |
| 80 | 150 K Ω | |
| 84 | 4300 Ω | |
| 86 | 100 Ω | |
| 88 | 5600 Ω | |
| 90 | 4300 Ω | |
| 92 | 1 K Ω | |
| 94 | 5600 Ω | |
| 102 | 2 K Ω | |

-Continued

| Circuit Element | Value and/or Number |
|---|---|
| 106 | part of CA3045 |
| 108 | part of CA3045 |
| 110 | part of CA3045 |
| 112 | 13 K Ω |

Thus there has been described an improved method of monitoring the voltage level developed at a bus. The circuit described does not require an independent source of supply and receives its operating power directly from the bus.

Obviously, many modifications and variations of the present invention are possible in light of the above teachings. It is therefore to be understood that, within the scope of the appended claims, the invention may be practiced otherwise than as specifically described.

What is claimed is:

1. An overvoltage protection circuit for monitoring the voltage at a bus comprising:
   constant current source powered directly from said bus voltage for generating a constant current output;
   compensated voltage means for establishing a stabilized voltage reference from said constant current output;
   first differential amplifier for comparing a first voltage derived from said reference to said bus voltage and conducting an output whenever said bus voltage exceeds said first voltage; and
   second differential amplifier for comparing a second different voltage derived from said reference to said bus voltages and conducting an output whenever said bus voltage exceeds said second voltage.

2. The overvoltage protection circuit of claim 1 wherein said constant current source comprises a diode and transistor combination, said diode being driven directly said bus voltage and establishing a constant voltage drop across the base to emitter junction of said transistor, the collector of said transistor conducting a constant current output in response thereto.

3. The overvoltage protection circuit of claim 2 wherein said compensated voltage means comprises a zener diode connected to oppose the current from said collector of said transistor thus establishing a constant voltage across said zener diode, said constant directly zener voltage being connected in parallel across a forward bias diode and a plurality of resistive elements to establish different voltage reference levels, said forward bias diode providing temperature compensation for said zener diode.

4. In a overvoltage protection circuit including a zener diode and a forward bias diode in parallel therewith, a method of protecting a bus to which a voltage is applied comprising the steps of:
   generating a constant current from said bus voltage;
   opposing the flow of said constant current by said zener diode to establish a relatively constant voltage;
   utilizing said forward bias diode to compensate for temperature changes in said zener diode, said forward bias diode having a temperature coefficient in approximately the same range as said zener diode, thus providing a stabilized compensated voltage;
   deriving at least one reference voltage from said compensated voltage which is representative of an overvoltage level;
   comparing said bus voltage with each said reference voltage; and
   causing an output to be produced when said bus voltage exceeds said reference voltage.

* * * * *